(12) United States Patent
Shimizu et al.

(10) Patent No.: US 8,123,136 B2
(45) Date of Patent: Feb. 28, 2012

(54) PROCESSING APPARATUS OF PORTABLE ELECTRONIC DEVICES, PORTABLE ELECTRONIC DEVICE, AND PROCESSING SYSTEM OF PORTABLE ELECTRONIC DEVICES

(75) Inventors: Hiroo Shimizu, Yokohama (JP); Kiyohito Sudo, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 171 days.

(21) Appl. No.: 12/558,698

(22) Filed: Sep. 14, 2009

(65) Prior Publication Data

US 2010/0243738 A1 Sep. 30, 2010

(30) Foreign Application Priority Data

Mar. 25, 2009 (JP) ................................. 2009-073895
Mar. 31, 2009 (JP) ................................. 2009-086811

(51) Int. Cl.
 *G06K 19/06* (2006.01)
(52) U.S. Cl. .................... 235/492; 235/380; 235/451
(58) Field of Classification Search .................. 235/492, 235/380, 375, 487, 451
See application file for complete search history.

(56) References Cited

U.S. PATENT DOCUMENTS

| | | | | |
|---|---|---|---|---|
| 7,395,429 B2 * | 7/2008 | Kitani et al. | .................. | 713/171 |
| 2004/0256470 A1 * | 12/2004 | Takami et al. | ................ | 235/492 |
| 2005/0167512 A1 * | 8/2005 | Minemura et al. | ............ | 235/492 |
| 2007/0050852 A1 * | 3/2007 | Yoshii et al. | .................... | 726/27 |
| 2007/0116292 A1 | 5/2007 | Kurita et al. | | |
| 2007/0223521 A1 * | 9/2007 | Teruyama | ..................... | 370/463 |
| 2008/0005261 A1 | 1/2008 | Adams et al. | | |
| 2008/0223925 A1 * | 9/2008 | Saito et al. | ..................... | 235/380 |

FOREIGN PATENT DOCUMENTS

| | | |
|---|---|---|
| JP | 2005-216234 | 8/2005 |
| JP | 2007-048103 | 2/2007 |
| KR | 10-2008-0067605 | 7/2008 |
| WO | WO 2010/049112 | 5/2010 |

OTHER PUBLICATIONS

Singapore Search Report dated May 12, 2010 for Appln. No. 200906104-5.
"ISO/IEC FCD 14443-3: Identification cards—Contactless integrated circuit(s) cards—Proximity cards—Part 3: Initialization and anticollision"; ISO/IEC JTC1/SC17 N1531, Jun. 11, 1999, pp. 1-38.
"ISO/IEC FCD 14443-4: Identification cards—Contactless integrated circuit(s) cards—Proximity cards—Part 4: Transmission protocol"; ISO/IEC JTC1/SC17 N1689, Mar. 10, 1999, pp. 1-33.

* cited by examiner

*Primary Examiner* — Edwyn Labaze
(74) *Attorney, Agent, or Firm* — Pillsbury Winthrop Shaw Pittman, LLP

(57) ABSTRACT

A processing apparatus of portable electronic devices, a portable electronic device, and a processing system of portable electronic devices are provided, each of which can process data at high speed. The processing apparatus has a transmitting/receiving unit configured to transmit and receive data to and from the portable electronic device. In the processing, the transmitting/receiving unit generates a first command and adds a second command to the first command.

7 Claims, 6 Drawing Sheets

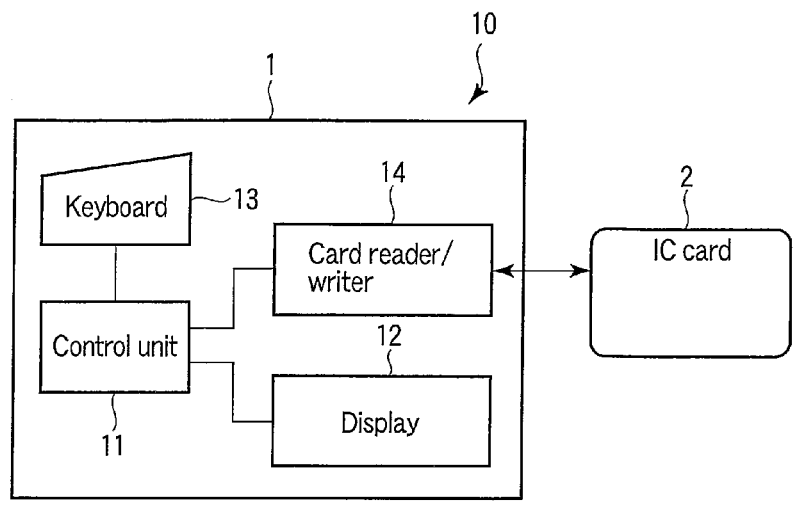
F I G. 1
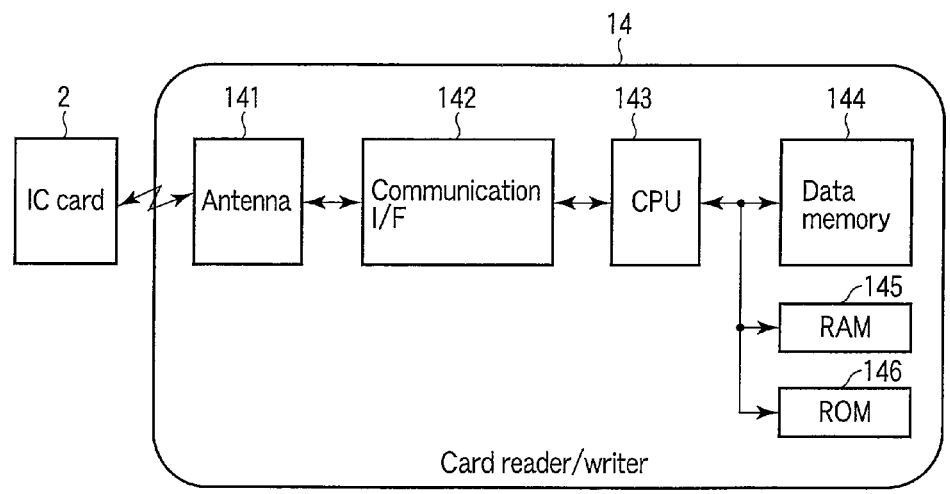
F I G. 2

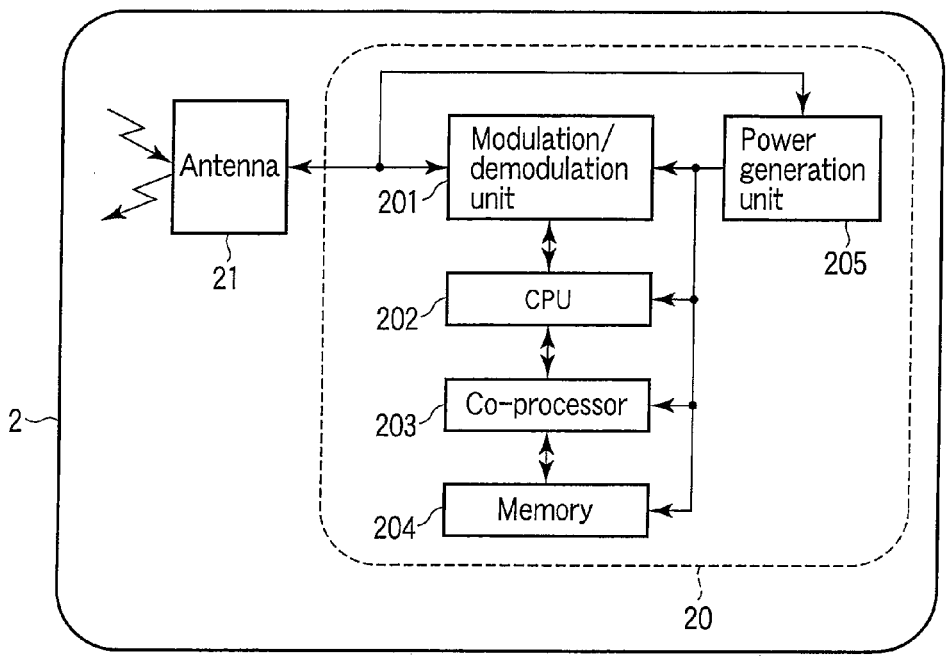
F I G. 3
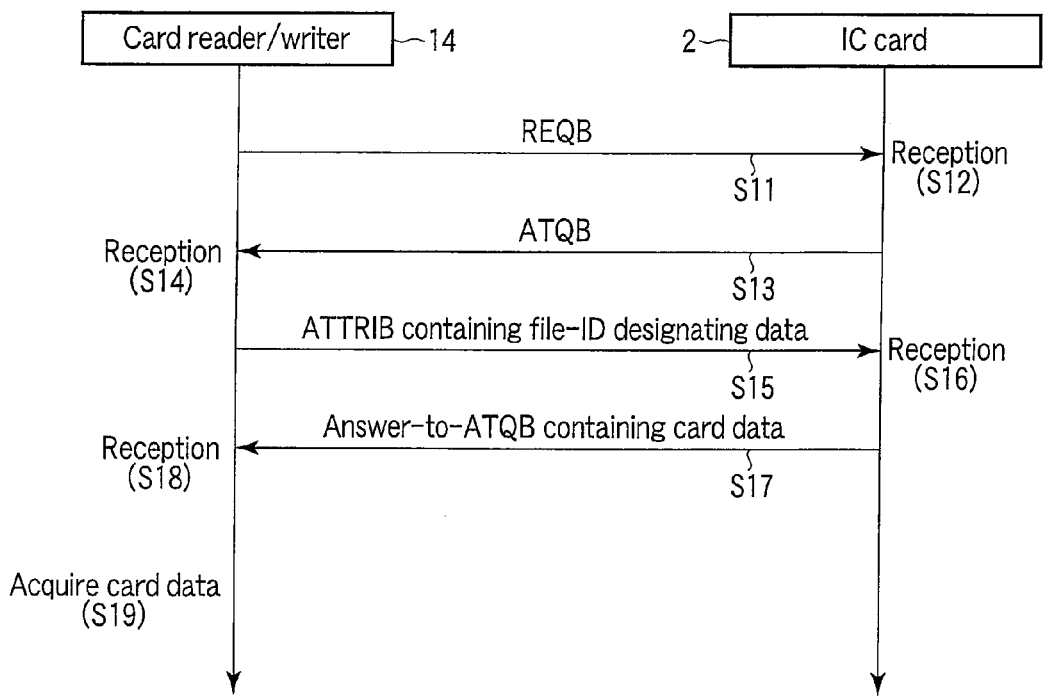
F I G. 4

Format of ATTRIB command

| 1st | 2nd, 3rd, 4th, 5th | 6th | 7th | 8th | 9th | 10th · · · · · | |
|---|---|---|---|---|---|---|---|
| 1D (1) | Identifier (4) | Param1 (1) | Param2 (1) | Param3 (1) | Param4 (1) | Higher layer INF Option-0 or more bytes | CRC_B (2) |

Format of Answer-to-ATTRIB

| 1st | | 2nd | |
|---|---|---|---|
| MBLI | CID | Higher layer Response Option-0 or more bytes | CRC_B |
| 1 byte | | | 2 bytes |

Format of REQB command

| 1st byte | 2nd byte | 3rd byte | 4th, 5th bytes |
|---|---|---|---|
| Apf 1 byte | AFI 1 byte | PARAM 1 byte | CRC_B 2 bytes |

Coding of PARAM part

| b8 | b7 | b6 | b5 | b4 | b3 | b2 | b1 |
|---|---|---|---|---|---|---|---|
| RFU | | | Extended ATQB supported | REQB/ WUPB | N(Number of slot) | | |

FIG. 8

Format of ATQB response

| 1st | 2nd, 3rd, 4th, 5th | 6th, 7th, 8th, 9th | 10th,11th,12th,13th | 14th, 15th |
|---|---|---|---|---|
| 50 1 byte | PUPI 4 bytes | Application data 4 bytes | Protocol info 4 bytes | CRC_B 2 bytes |

Coding of Protocol Info part

| 1st | 2nd | 3rd | 4th Extended ATQB |
|---|---|---|---|
| Bit_rate_capability (8 bits) | Max_frame_size (4 bits) / Protocol_type (4 bits) | FWI (4 bits) / ADC (2 bits) / F0 (2 bits) | SFGI (4 bits) / RFU (4 bits) |

If card data is added to ATQB response

| 1st | 2nd, 3rd, 4th, 5th | 6th, 7th, 8th, 9th | 10th, 11th, 12th | 13th | 14th,15th |
|---|---|---|---|---|---|
| 50 1 byte | PUPI 4 bytes | Application data 4 bytes | Protocol info 3 bytes | Card report | CRC_B 2 bytes |

FIG. 9

Format of ATTRIB command

| 1st byte | 2nd ~5th bytes | 6nd ~9th bytes | 10th, · · · · · · · · bytes | |
|---|---|---|---|---|
| '1D' (1byte) | Identifier (4bytes) | Param1~4 (4bytes) | Higher layer-INF (0 or more bytes) | CRC_B (2bytes) |

Authentication command

Format of ATA response
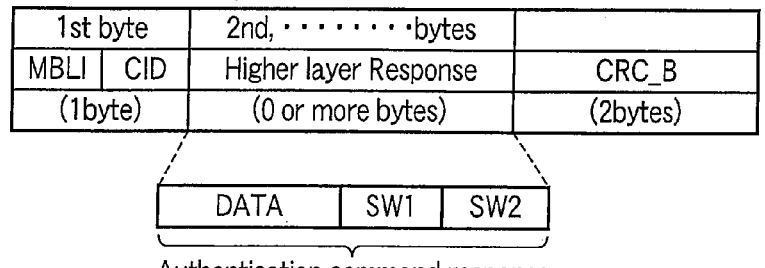
Authentication command response
FIG. 12
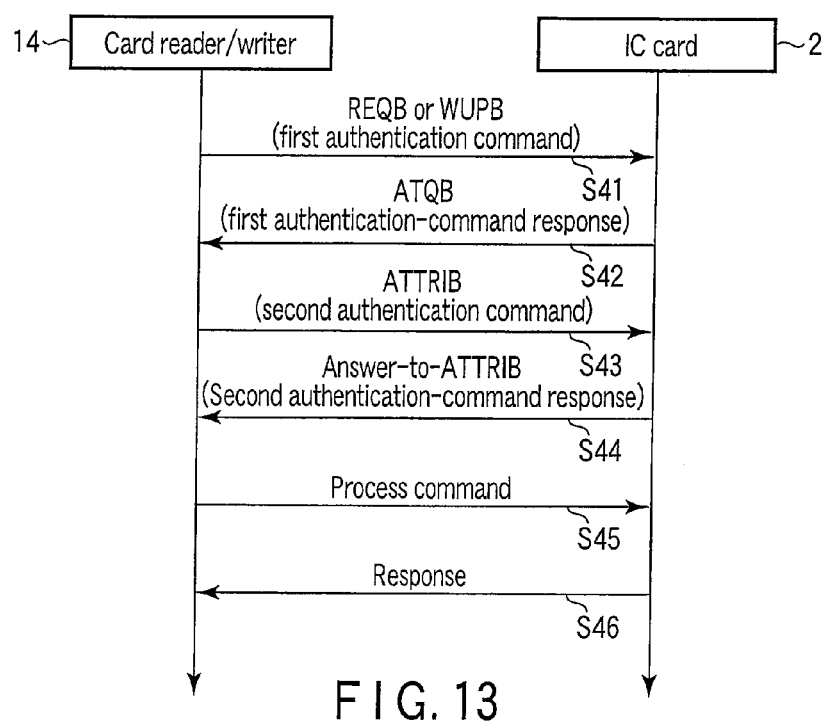
FIG. 13
| No | Command name | Maximum wait time |
|---|---|---|
| 1 | READ BINARY | ···etu |
| 2 | WRITE BINARY | ···etu |
| 3 | UPDATE BINARY | ···etu |
| 4 | READ RECORD(S) | ···etu |
| n-1 | SELECT FILE | ···etu |
| n | VERIFY | ···etu |
FIG. 14

PROCESSING APPARATUS OF PORTABLE ELECTRONIC DEVICES, PORTABLE ELECTRONIC DEVICE, AND PROCESSING SYSTEM OF PORTABLE ELECTRONIC DEVICES

CROSS-REFERENCE TO RELATED APPLICATIONS

This application is based upon and claims the benefit of priority from prior Japanese Patent Applications No. 2009-073895, filed Mar. 25, 2009; and No. 2009-086811, filed Mar. 31, 2009, the entire contents of both of which are incorporated herein by reference.

BACKGROUND OF THE INVENTION

1. Field of the Invention

The present invention relates to a processing apparatus of portable electronic devices, a portable electronic device, and a processing system of portable electronic devices, each configured to transmit and receive various commands and to process data in various ways in accordance with the commands.

2. Description of the Related Art

IC cards used as portable electronic devices comprise a main body and an IC module. The main body is shaped like a card and made of plastic, etc. The IC module is embedded in the main body and has an IC chip. The IC chip has a nonvolatile memory, a volatile memory, and a CPU. The nonvolatile memory is, for example, an electronically erasable programmable read-only memory (EEPROM) or a flash ROM. The volatile memory is, for example, a RAM. The CPU can perform various operations.

Any IC card that accords with Standard ISO/IEC7816-1 and 2 of the International Standards Organization excels in portability. The IC card can communicate with external apparatuses and can perform complex operations. IC cards can hardly be forged, and can store data that should be kept in secret. IC cards are used in security systems, as ID cards of license holders, company employees, club members and insurance holders, credit cards, passports, or ID cards for use in electronic transactions.

In recent years, IC cards having various functions have come into use. Jpn. Pat. Appln. KOKAI Publication No. 2005-216234 (Japanese patent document), for example, discloses an IC card that comprise a contact interface and a non-contact interface. The contact interface has metal terminals. The non-contact interface has an antenna. The antenna is designed to transmit and receive radio waves.

Any IC card (i.e., non-contact IC card) that has a non-contact interface can perform communication involving no physical contacts, in order to transmit and receive data. The non-contact IC card detects the magnetic field emanating from a card reader/writer. The non-contact IC card generates an electromotive force, because the magnetic field achieves electromagnetic induction to the antenna. The electromotive force thus generated drives the components of the non-contact IC card.

Usually, an IC card and the processing apparatus of IC card perform processes, to authenticate each other, and thereby determine whether they can communicate to exchange data. Jpn. Pat. Appln. Publication No. 2007-48103, a Japanese patent document, discloses a technique of permitting an IC card and an apparatus to communicate with each other, if they are found authenticated to communicate mutually.

To process the read from, for example, an IC card that accords with Standard ISO/IEC1444, Type B, a processing apparatus of IC-card first performs an anti-collision sequence and then acquires the card data (medium data) from the IC card.

To perform the anti-collision sequence, the IC card reader/writer incorporated in the processing apparatus of IC-card transmits a REQB command to the IC card. On receiving the REQB command, the IC card transmits an ATQB, as response, to the IC card reader/writer.

In the processing apparatus of IC-card, the ATQB is supplied to the IC card reader/writer. The IC card reader/writer transmits an ATTRIB command to the IC card. On receiving the ATTRIB command, the IC card transmits Answer-to-ATTRIB (ATA), as response, to the IC card reader/writer.

The processing apparatus of IC-card first performs the above-mentioned anti-collision sequence and then performs a process to acquire the card data of the IC card.

In order to acquire the card data of the IC card, the processing apparatus of IC-card transmits a select command and a read command to the IC card. The selected command contains the data that identifies one of the files the IC card holds. To read the card data, the processing apparatus of IC-card adds the data identifying the file containing the card data, to the select command.

On receiving the select command, the IC card selects a file in accordance with the data designating the file. The file thus selected is read from the IC card and transmitted to the processing apparatus of IC-card.

As described above, the anti-collision sequence should be performed to acquire data from the IC card by virtue of non-contact communication. However, the communication may be performed in an undesirable way if the power supply to the IC card from the processing apparatus of IC-card is interrupted or if the noise is generated in the IC card due to disturbance.

The communication may be performed in an undesirable way during the anti-collision sequence or before the transmission of the read command. In this case, the processing apparatus of IC-card needs to perform the anti-collision sequence again. Consequently, much time will elapse before the IC-card data is acquired.

To accomplish the mutual authentication of the IC card and the processing apparatus of IC-card, the processing apparatus of IC-card generates a random number. The processing apparatus then encrypts the random number. The processing apparatus transmits the random number encrypted, or encrypted data, to the IC card. The IC card decrypts the encrypted data and transmits the data back to the processing apparatus of IC-card. The IC card generates a random number and encrypts the random number. The random number encrypted is transmitted to the processing apparatus of IC-card.

The processing apparatus of IC-card decrypts the encrypted data and transmits the same to the IC card. The IC card determines whether the decrypted data that has been transmitted from the processing apparatus is identical to the random number. Similarly, the processing apparatus of IC-card determines whether the decrypted data transmitted from the IC card is identical with the random number. Thus, the IC card and the processing apparatus of IC-card authenticate each other.

The mutual authentication described above is accomplished as commands and responses are exchanged several times between the IC card and the processing apparatus of IC-card. In most cases, the number of times the commands and responses are exchanged directly influences the speed of processing data. In view of this, this number of times should better be decreased as much as possible.

The IC cards and processing apparatus of IC-card and the IC card, which are disclosed in Jpn. Pat. Appln. Publication No. 2007-48103, exchange commands and response with each other, two times, to authenticate each other. Consequently, the mutual authentication requires a long time including the time required to achieve the exchange of commands and responses.

BRIEF SUMMARY OF THE INVENTION

According to one embodiment of the invention, a processing apparatus of portable electronic devices, a portable electronic device, and a processing system of portable electronic devices can be provided, each of which can process data at high speed.

A processing apparatus of portable electronic devices, which is an embodiment of this invention, comprises: a transmitting/receiving unit configured to transmit and receive data to and from a portable electronic device; a first command processing unit configured to cause the transmitting/receiving unit to transmit a first command to the portable electronic device; and a second command processing unit configured to add a second command to the first command the first command processing unit is to transmit to the portable electronic device.

A portable electronic device, which is an embodiment of this invention, comprises: a transmitting/receiving unit configured to transmit and receive data to and from a processing apparatus of portable electronic devices; a first response processing unit configured to perform a first process in accordance with a first command received at the transmitting/receiving unit, thereby generating a first response based on a result of the first process, and to transmit the first response to the processing apparatus; and a second response processing unit configured to perform a second process in accordance with a second command added to the first command, to generate a second response from the result of the second process and to add the second response to the first response.

A processing system, which is an embodiment of this invention, has a portable electronic device and a processing apparatus of portable electronic devices, the processing apparatus comprising: a first transmitting/receiving unit configured to transmit and receive data to and from a portable electronic device; a first command processing unit configured to cause the transmitting/receiving unit to transmit a first command to the portable electronic device; and a second command processing unit configured to add a second command to the first command the first command processing unit is to transmit to the portable electronic device, and the portable electronic device comprising: a transmitting/receiving unit configured to transmit and receive data to and from the processing apparatus; a first response processing unit configured to perform a first process in accordance with a first command received at the transmitting/receiving unit, thereby generating a first response based on a result of the first process, and to transmit the first response to the portable electronic; and a second response processing unit configured to perform a second process in accordance with a second command added to the first command, to generate a second response from the result of the second process and to add the second response to the first response.

Thus, this invention can provide a processing apparatus of portable electronic devices, a portable electronic device, and a processing system of portable electronic devices can be provided, each of which can process data at high speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

FIG. 1 is a block diagram explaining an exemplary configuration of a processing system of portable electronic devices, according to a first embodiment of the present invention;

FIG. 2 is a block diagram explaining an exemplary configuration of the card reader/writer shown in FIG. 1;

FIG. 3 is a block diagram explaining an exemplary configuration of the IC card shown in FIG. 1;

FIG. 4 is a sequence diagram for explaining a process of acquiring card data;

FIG. 8 is a diagram explaining an exemplary format of REQB command that is used in the sequence of FIG. 7;

FIG. 9 is a diagram explaining an exemplary format of an ATQB command that is used in the sequence of FIG. 7;

FIG. 12 is a diagram explaining an exemplary format of Answer-to-ATTRIB command that is used in the sequence of FIG. 10;

FIG. 13 is a sequence diagram for explaining authentication performed in a processing system of portable electronic devices, according to a third embodiment of the present invention; and FIG. 14 is a diagram explaining the maximum time for every command.

DETAILED DESCRIPTION OF THE INVENTION

Figures 5, 6, 7:
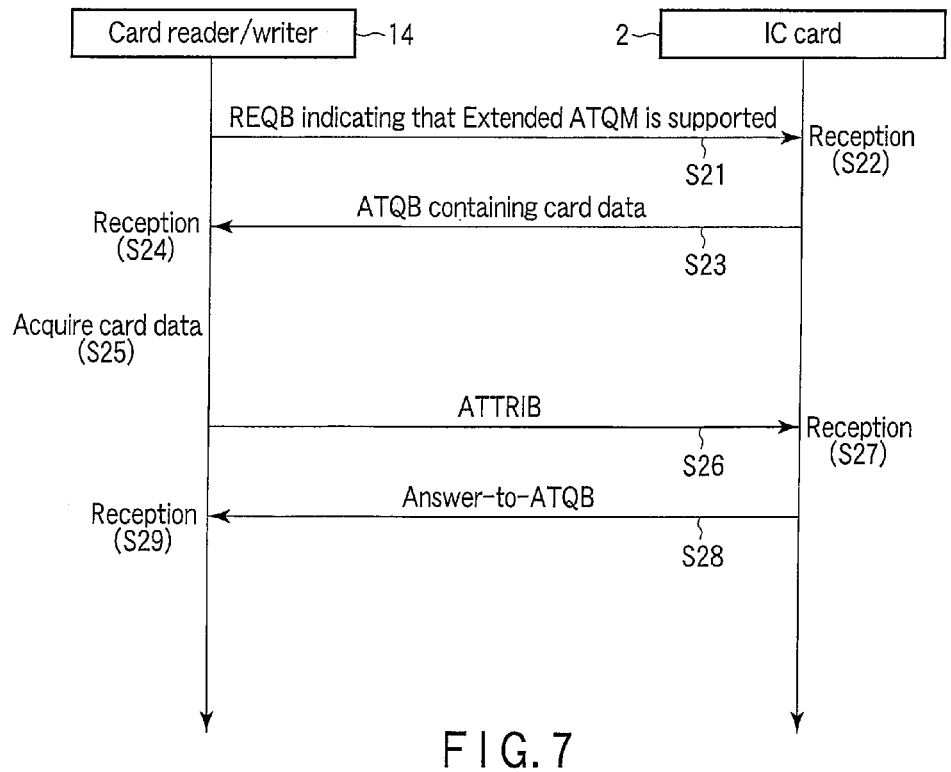
FIG. 5 is a diagram explaining an exemplary format of ATTRIB command that is used in the sequence of FIG. 4.
FIG. 6 is a diagram explaining an exemplary format of Answer-to-ATTRIB command that is used in the sequence of FIG. 4.
FIG. 7 is a diagram explaining another exemplary sequence of process for acquiring card information.

Processing apparatus of portable electronic devices, a portable electronic device, and a processing system of the portable electronic devices, according to embodiments of this invention, will be described in detail with reference to the accompanying drawings.

A non-contact IC card and a non-contact IC card reader/writer, which accord with, for example, Standard ISO/IEC 14443, Type B, will be described below.

The non-contact IC card reader/writer transmits command data (command) to the non-contact IC.

On receiving the command, the non-contact IC card starts performing a process in accordance with the command. The non-contact IC card transmits the result of the process, as response data (response), to the non-contact IC card reader/writer.

The non-contact IC card reader/writer transmits the command and receives the response, as described above. The non-contact IC card reader/writer therefore reads the card-characteristic data from the non-contact IC card.

How the card characteristic data is read from the non-contact IC card during the anti-collision sequence will be explained. In the first embodiment, the non-contact IC card reader/writer performs an optional function of transmitting commands to the IC card, thereby reading the card-characteristic data from the non-contact IC card during the anti-collision sequence. This can greatly shorten the time required to acquire the card-characteristic data after the start of the communication with the non-contact IC card.

The anti-collision sequence is a sequence for preventing troubles that may otherwise result from the wave interference between the non-contact IC card reader/writer and the non-contact IC card. This is why Standard ISO/IEC 14443, Type B, defines an anti-collision command.

Non-contact communication, if performed between the IC card and the IC card reader/writer, is of course one-to-one communication. This means that no anti-collision sequence need be performed if the IC card and the IC card reader/writer undergo contact communication.

While the IC card and the IC card reader/writer are undergoing non-contact communication, other IC cards may exist in the region where the IC card and the IC card reader/writer can communicate by radio. If this is the case, the responses made by the non-contact IC cards may collide with one another.

Such collision of responses can be avoided if the anti-collision sequence is performed. Moreover, the anti-collision sequence can establish the communication between one non-contact IC card reader/writer and one non-contact IC card.

After the one-to-one communication has been established, the IC card and the IC card reader/writer can perform various processes, while exchanging commands and responses.

As indicated above, the anti-collision sequence need not be performed if the contact communication is performed between the IC card and the IC card reader/writer. The contact communication can therefore be faster than the non-contact communication.

On the other hand, the anti-collision sequence must be performed if the contact communication is performed between the IC card and the IC card reader/writer. The non-contact communication is inevitably slower than the contact communication.

The file format defined in Standard ISO/IEC 14443, Type A, is simpler than the file format defined in Standard ISO/IEC 14443, Type B. Any IC card system based on the communication scheme according to Standard ISO/IEC 14443, Type A, can therefore achieve faster communication than the IC card system based on the communication scheme according to Standard ISO/IEC 14443, Type B.

Therefore, the IC card system base on the communication scheme according to Standard ISO/IEC 14443, Type B needs a longer time to acquire the card data than the IC card system base on the communication scheme according to Standard ISO/IEC14443, Type A. In order to solve this problem, the non-contact IC card reader/writer according to an embodiment of this invention reads card data from the non-contact IC card during the anti-collision sequence.

FIG. 1 is a block diagram explaining an exemplary configuration of a processing system of portable electronic devices, according to a first embodiment of the present invention.

As shown in FIG. 1, the processing system 10 comprises an processing apparatus of portable electronic devices (terminal apparatus) 1 and a portable electronic device (IC card) 2. The terminal apparatus 1 comprises a control unit 11, a display 12, a keyboard 13, and a card reader/writer 14. The terminal apparatus 1 and the IC card communicate with each other by radio, exchanging data between them.

The control unit 11 has a CPU, a ROM and a RAM. The control unit 11 controls the other components of the terminal apparatus 1. For example, the control unit 11 first selects a communication scheme, such as ISO/IEC14443, Type A, ISO/IEC1444, Type B and FeliCa, and also a plurality of applications. Then, the control unit 11 executes the communication scheme and the applications. The following description is based on the assumption that the data is exchanged, using the communication protocol of Type B.

Controlled by the control unit 11, the display 12 displays various items of data. For example, the display 12 displays the result of communication with the IC card 2, the result of authentication, and the like.

When operated by the user, the keyboard 13 generates operation signals. The operation signals are input from the keyboard 13 to the control unit 11.

The card reader/writer 14 is an interface that is configured to achieve the communication between the card 2 and the terminal apparatus 1. The card reader/writer 14 supplies power and a clock signal to the IC card 2, performs a reset control on the IC card 2, and transmits and receives data to and from the IC card 2. That is, the card reader/writer 14 functions as a data transmitting/receiving unit.

The control unit 11 causes the card reader/writer 14 to input various commands to the IC card 2. That is, the control unit 11 functions as a command processing unit. The IC card 2 may receive a data-writer command from the card reader/writer 14. In this case, the data received is written in the nonvolatile memory incorporated in the IC card 2.

The control unit 11, which has transmitted a read command to the IC card 2, reads data from the IC card. The control unit 11 then performs various processes on the data received from the IC card 2.

FIG. 2 is a block diagram outlining the configuration of the card reader/writer 14 shown in FIG. 1.

As shown in FIG. 2, the card reader/writer 14 comprises an antenna 141, a communication I/F 142, a CPU 143, a data memory 144, a RAM 145, and a ROM 146.

The antenna 141 generates a magnetic field that corresponds to the data to transmit to the IC card 2. Thus, the antenna 141 transmits the data to the IC card 2. The antenna 141 recognizes the data transmitted from the IC card 2, from the current generated through electromagnetic induction.

The communication I/F 142 controls the data should be transmitted to the IC card 2 and the data received from the IC card 2. The CPU 143 controls the communication with the IC card 2. The data memory 144 is a nonvolatile memory such as EEPROM or FRAM. The RAM 145 is a working memory that temporarily store the data transmitted from, for example, the IC card 2. The ROM 146 is a memory storing control programs.

The CPU 143 performs a signal process on the data received from the IC card 2 and the data to transmit to the IC card 2. The CPU 143 performs encoding, decoding, modulation and demodulation. Note that the CPU 143 performs the signal process in accordance with the communication protocol of Type B.

That is, the CPU 143 performs amplitude-shift keying (ASK) 10% modulation and non-return to zero (NRZ) encoding, on the data received from the IC card 2 and the data to transmit thereto. Further, the CPU 143 amplifies the data modulated and also the data received by the antenna.

In this case, the CPU 143 amplifies the carrier of 13.56 MHz, by about 10%, and transmits NRZ-coded data to the IC card 2. The IC card 2 modulates the phase with sub-carrier of 847.5 KHz, i.e., one-sixteenth (1/16) of carrier frequency. The IC card 2 transmits the NRZ-coded data, i.e., response, to the card reader/writer 14.

Proximal, non-contact IC cards can communicate with a card reader/writer so long as it exists at a distance not exceeding 10 cm from the card reader/writer 14. The card reader/writer 14 detects any IC card existing at distance of 10 cm or less, and process the data transmitted from the IC card 2.

FIG. 3 is a block diagram explaining an exemplary configuration of the IC card 2 shown in FIG. 1.

As shown in FIG. 3, the IC card 2 comprises a main body and an IC module. The main body is shaped like a card and made of plastic, etc. The IC module is embedded in the main body and has an IC chip 20 and a transmission/reception antenna unit (antenna) 21. The IC chip 20 and the antenna 21 are incorporated in the IC module and are connected to each other. The IC module has a nonvolatile memory, a volatile memory, and a CPU. The nonvolatile memory is, for example, an electronically erasable programmable read-only memory (EEPROM) or a flash ROM. The volatile memory is, for example, a RAM. The CPU can perform various operations.

The IC chip 20 comprises a modulation/demodulation unit 201, a CPU 202, a co-processor 203, a memory 204, and a power generation unit 205.

The modulation/demodulation unit 201 is connected to the antenna 21. The antenna 21 and the modulation/demodulation unit 201 serve as interface that achieves non-contact communication between the IC card 2 and the card reader/writer 14 of the terminal apparatus 1. The modulation/demodulation unit 201 and the antenna 21 function as transmission/reception unit.

The modulation/demodulation unit 201 comprises a transmission/reception circuit that amplifies the data to transmit from the IC card 2 and the data received from the terminal apparatus 1. That is, the modulation/demodulation unit 201 performs ASK-10% modulation, modulating the carrier with the data to transmit from the IC card 2 or with the data received from the terminal apparatus 1.

The CPU 202 functions as control unit that controls the other components of the IC card 2. The CPU 202 performs various processes in accordance with the control programs and control data that are stored in the memory 204. The CPU 202 performs the processes in response to, for example, a command received from the card reader/writer 14. From the results of processes thus performed, the CPU 202 generates data such as a response. Thus, the CPU 202 functions as response-processing unit.

The co-processor 203 processes a signal that accords with the communication protocol of Type B. That is, the co-processor 203 can perform NRZ-encoding and NRZ-decoding on the data it has received from the CPU 202.

The memory 204 is a module such as a ROM, a RAM or a nonvolatile memory.

The ROM is a nonvolatile memory storing control programs and control data. The ROM holding the control programs and the control data has been incorporated into the main body of the IC card 2 during the manufacture of the IC card 2. The control programs and the control data have been stored in the ROM in accordance with the specification of the IC card 2.

The RAM is a volatile memory that functions as a working memory. That is, the RAM temporarily stores the data the CPU 202 is processing. Further, the RAM temporarily stores, for example, the data transmitted from the terminal apparatus 1 and received by the antenna 21. The RAM temporarily stores the programs the CPU 202 executes, too.

The nonvolatile memory is, for example, an EEPROM or a flash ROM, in which data can be written and rewritten. The nonvolatile memory may store control programs and various data items, so that the IC card 2 may be used for specific purposes.

The nonvolatile memory, for example, holds program files and data files, in which control programs and various data items are written. The CPU 202 can execute the programs stored in the nonvolatile memory, or ROM, thereby to perform various processes.

The power generation unit 205 receives a radio wave from the card reader/writer 14. In the power generation unit 205, a rectifier circuit rectifies and smoothes the wave received. Hence, the power generation unit 205 generates a stabilized DC voltage. The voltage is applied from the power generation unit 205 to all other components of the IC card 2, but the antenna 21. These components can therefore be driven (or activated).

In the terminal apparatus 1 of FIG. 1, the control unit 11 causes the card reader/writer 14 to transmit a setting command (initial-setting command) to the IC card 2. The terminal apparatus 1 can therefore communicate with the IC card 2. Thus, the control unit 11 functions as setting process unit. The setting command is, for example, an activation command or a medium-select command.

To detect the IC card 2, the card reader/writer 14 repeatedly transmits an activation command that accords with the communication protocol of Type B toward the IC card 2. More precisely, the card reader/writer 14 transmits request command type B (REQB), wake-up command type B (WUPB) or the like, toward the IC card 2.

When the IC card 2 enters a region in which it can communicates with the card reader/writer 14, it is activated within 5 ms, assuming an idle state. In this case, the CPU 202 of the IC card 2 transmits, to the card reader/writer 14, an answer to request command type B (ATQB) that is a response to the activation command.

In order to receive ATQB, the card reader/writer 14 determines whether the IC card 2 exists in the region where the IC card can communicates with the card reader/writer 14. To this end, the card reader/writer 14 transmits a medium-select command (ATTRIB), selecting the IC card 2. The card reader/writer 14 can therefore communicate with the IC card 2. The card reader/writer 14 transmits a HALT command to any other IC cards 2, which it has not selected.

The CPU 202 of the IC card 2 receives ATTRIB from the card reader/writer 14. In this case, Answer-to-ATTRIB (ATA), which is a response to ATTRIB, is transmitted from the IC card 2 to the card reader/writer 14. Then, the terminal apparatus 1 and the IC card 2 are set to the ordinary command-processing mode.

A process of acquiring the card ID data (card data) stored in the memory 204 of the IC card 2 will be explained below.

The process of acquiring the card data of an IC card that transmits and receives data by virtue of contact communication according to ISO/IEC7816 will be described first. The card data of the IC card that accords with ISO/IEC7816 is contained in answer to reset (ATR). The card data is stored in, for example, the historical character that is contained in the ATR frame. A card reader/writer acquires the card data contained in ATR received.

That is, the card reader/writer can acquire the card data in the initial response period. In order to process the data transmitted from the contact-type IC card, the card reader/writer and the contact-type IC card are set into mutual contact to achieve communication between them. The card data being transmitted from the contact-type IC card can hardly be accessed. Hence, the contact-type IC card can transmit ATR containing the card data, to the card reader/writer.

A process of acquiring the card data of an IC card that transmits and receives data by virtue of non-contact communication according to ISO/IEC1444, Type A, will be described. A card reader/writer first performs an anti-collision sequence and then transmits a request-for-answer to select (RATS) command to the non-contact type IC card.

The RATS command instructs the IC card to store the card data in the historical character that is contained in the answer to select (ATS).

In response to the RATS command, the IC card stores the card data in the ATS frame and transmits ATS to the card reader/writer. On receiving ATS, the card reader/writer acquires the card data stored in the ATS.

Next, a process of acquiring the card data of an IC card that transmits and receives data by virtue of non-contact communication according to ISO/IEC1444, Type B, will be described. A card reader/writer first performs an anti-collision sequence and then transmits a select command to the non-contact type IC card.

The select command instructs the IC card to select a file that holds the card data of the IC card. In response to the select command, the IC card selects the file that holds the card data.

Further, the card reader/writer transmits a read command to the IC card, instructing the IC card to read the card data stored in the file selected. On receiving the read command, the IC card reads the card data from the file selected and transmits the card data to the card reader/writer.

The card reader/writer, which has transmitted to the read command, can receive the card data from the IC card. As described above, the card reader/writer first performs the anti-collision sequence, then transmits a select command, and further transmits a read command, in order to acquire the card data from the IC card. A long time inevitably elapses before the IC-card data is acquired after the IC card has started communicating with the card reader/writer.

During the process described above, the supply of power from the card reader/writer to the IC card may be interrupted or noise may be generated in the IC card due to disturbance. In this case, the communication is performed in an undesirable way. Assume that the communication is so performed during the anti-collision sequence or before the transmission of the read command. Then, the terminal apparatus 1 (i.e., processing apparatus of IC-card) needs a long process time to acquire the card data.

A card-data acquiring process according to this embodiment of this invention will be described.

FIG. 4 is a sequence diagram explaining an exemplary method of acquiring the card data.

To perform the card-data acquiring process according to the embodiment, the card reader/writer 14 utilizes an ATTRIB command.

The CPU 143 of the card reader/writer 14 transmits REQB or WUPB at predetermined intervals in the region where the IC card 2 can communicate with the card reader/writer 14 (Step S11). REQB or WUPB, i.e., activation command, contains a parameter APf, a use identifier AFI, an attribute-data parameter PARAM, a cyclic redundancy check code CRC_B, etc. Note that the parameter APf is used in REQB of Type B.

Activated with the magnetic field emanating from the card reader/writer 14, the IC card 2 starts waiting for REQB or WUPB coming from the card reader/writer 14. In this state, the IC card 2 receives either REQB or WUPB (Step S12). Then, the CPU 202 of the IC card 2 performs setting (initial-setting) for achieving the communication with the card reader/writer 14. That is, the CPU 202 functions as setting process unit.

After performing the setting, the CPU 202 generates ATQB in accordance with REQB. ATQB contains, for example, a parameter APa, an identifier, applied data, protocol data, CRC_B, etc. The parameter APa will be used in ATQB of Type B. The identifier is, for example, ID number such as PUPI or CID, inherent to the IC card 2. The applied data conveys application data. The protocol data contains data items, such as communication speed, maximum frame size, protocol type, etc., all supported in the IC card 2.

The modulation/demodulation unit 201 of the IC card 2 performs a signal process on ATQB, causing the antenna 21 to transmit ATQB to the card reader/writer (Step S13).

The card reader/writer 14 receives ATQB transmitted from the IC card 2 (Step S14). From the ATQB, the card reader/writer 14 determines that the IC card 2 exists in the region where the IC card 2 can communicates with it. A plurality of IC cards may exist in this region. If this is the case, the card reader/writer 14 uses a Slot-Marker command or adopts a time-slot scheme, receiving ATQBs from these IC cards.

On receiving ATQB from the IC card 2, the card reader/writer 14 generates a medium-select command (ATTRIB).

FIG. 5 is a diagram for explaining the format of ATTRIB transmitted from the terminal apparatus 1 according to the present embodiment. As seen from FIG. 5, ATTRIB contains, for example, parameter 1D, an identifier, parameter PARAM1-4, higher-layer information, and CRC_B, etc. The parameter 1D will be used in ATTRIB of Type B.

In most cases, the higher-layer information is a field used as an optional item and can include any data as desired. In this embodiment, the higher-layer information is used, designating the ID of the file that holds the card data about the IC card 2. That is, the card reader/writer 14 adds the data designating the file ID, as higher-layer information. The file-ID designating data is, for example, a card-data acquisition command for reading the file that holds the card data in the IC card 2.

The card reader/writer 14 transmits, to the IC card 2, ATTRIB that contains the higher-layer information to which the file-ID designating data is added (Step S15).

On receiving ATTRIB from the card reader/writer 14 (Step S16), the IC card 2 generates ATA and transmits the same to the card reader/writer 14 (Step S17).

ATTRIB the IC card 2 has received may contain the file-ID designating data. In this case, the IC card 2 selects the file holding the card data, in accordance with the file-ID designating data. The card data is read from the file and added to ATA.

FIG. 6 is a diagram for explaining the format of ATA transmitted from the IC card 2 according to this embodiment. As seen from FIG. 6, ATA contains, for example, MBLI, an identifier CID, a higher-layer response, CRC_B, etc. MBLI is a limit value for the internal buffer.

In most cases, the IC card 2 transmits ATA containing the higher-layer response to the card reader/writer 14 when it receives ATTRIB containing the higher-layer information. In this embodiment, the IC card 2 adds the card data read in accordance with the file ID, as a higher-layer response.

The card reader/writer 14 receives ATA (Step S18). The card reader/writer 14 acquires the card data contained in ATA (Step S19). The control unit 11 of the terminal apparatus 1 performs various processes in accordance with the card data. Thus, the control unit 11 functions as a unit for executing the communication scheme and the applications. The IC card 2 responds to the processes the control unit 11 performs.

The terminal apparatus 1 according to this embodiment, which processes the data of the IC card 2, adds file-ID designating data to the higher-layer information of ATTRIB before transmitting ATTRIB, as has been described above. In accordance with the file-ID designating data contained in the higher-layer information of ATTRIB, the IC card 2 reads the card data and adds the card data to the higher-layer response of ATA. The terminal apparatus 1 acquires the card data contained in the higher-layer response of ATA.

The terminal apparatus 1 can therefore acquire the card data from the IC card 2 during the anti-collision sequence. As a result of this, a processing apparatus of portable electronic devices, a portable electronic device, and a processing system of portable electronic devices can be provided, each of which can process data at high speed.

Another exemplary process of acquiring card data will be described.

FIG. 7 is a sequence diagram explaining another exemplary process of acquiring card data.

As shown in FIG. 7, the CPU 143 of the card reader/writer 14 transmits, via the antenna 141, REQB at prescribed intervals in the region where the IC card 2 can communicates with it (Step S21). The IC card 2 receives REQB transmitted from the card reader/writer (Step S22).

FIG. 8 is a diagram for explaining the format of REQB transmitted from the terminal apparatus 1. As seen from FIG. 8, REQB contains a parameter APf, a use identifier AFI, an attribute-data parameter PARAM, a cyclic redundancy check code CRC_B, etc. Note that the parameter APf is used in REQB of Type B.

REQB contains a bit that shows whether Extended ATQB is supported as attribute-data parameter PARAM.

If this bit is at high level, it shows that Extended ATQB is supported. If the bit is at low level, it shows that Extended ATQB is not supported.

The IC card 2 refers to the bit contained in REQB and showing whether Extended ATQB is supported. Thus, the IC card 2 determines whether Extended ATQB is supported in the card reader/writer 14.

That is, the IC card 2 determines that Extended ATQB is supported in the card reader/writer 14, if the bit contained in REQB is at high level. If the bit contained in REQB is at low level, the IC card 2 determines that Extended ATQB is not supported in the card reader/writer 14.

In response to REQB received, the CPU 202 of the IC card 2 generates ATQB. The IC card 2 transmits ATQB to the card reader/writer 14 (Step S23).

At this point, the CPU 202 may determine that ATQB is supported in the card reader/writer 14 that has transmitted REQB. In this case, the CPU 202 generates ATQB that corresponds to Extended ATQB.

FIG. 9 is a diagram for explaining the format of ATQB that the IC card 2 transmits to the card reader/writer 14 if the CPU 202 determines that the card reader/writer 14 supports Extended ATQB.

ATQB contains, for example, a parameter APa, an identifier, applied data, protocol data, CRC_B, etc. The parameter APa will be used in ATQB of Type B. The identifier is, for example, ID number such as PUPI or CID, inherent to the IC card 2. The applied data conveys application data. The protocol data contains data items, such as communication speed, maximum frame size, protocol type, etc., all supported in the IC card 2.

ATQB further contains a response to Extended ATQB, at the fourth byte of the protocol data. In the IC card 2, the card data is stored in the protocol data, at RFU of Extended ATQB.

Thus, the card data is read from the IC card 2 if the card reader/writer 14 that has transmitted REQB is found to support Extended ATQB. The IC card 2 stores the card data at RFU of Extended ATQB, i.e., protocol data of ATQB.

The card reader/writer 14 receives ATQB from the IC card 2 (Step S24). Therefore, the card reader/writer 14 determines that the IC card 2 exists in the region where the IC card 2 can communicates with it.

If ATQB received contains the card data, the card reader/writer 14 acquires the card data (Step S25).

More precisely, the card reader/writer 14 reads RFU of Extended ATQB contained in the protocol data of ATQB received, and acquires the card data.

On receiving ATQB, the card reader/writer 14 generates a medium-select command (ATTRIB). The card reader/writer 14 transmits the ATTRIB to the IC card 2 (Step S26).

The IC card 2 receives ATTRIB (Step S27). In response to ATTRIB, the IC card 2 then generates ATA and transmits the same to the card reader/writer 14 (Step S28).

The card reader/writer 14 receives ATA (Step S29). The card reader/writer 14 then starts performing various processes in accordance with the card data received. The IC card 2 responds to the various processes the card reader/writer 14 performs.

In the present embodiment, the IC card 2 adds the card data to ATQB. The embodiment is not limited to this configuration, nonetheless. The IC card 2 may add the card data to the information to transmit to the card reader/writer 14, for example at the end of ATQB such as ATA.

In this embodiment, the terminal apparatus 1 that process the data stored in the IC card 2 reads, as described above, the data showing whether Extended ATQB is supported, in order to transmit REQB, and the IC card 2 reads the card data and adds the card data to the protocol data, generating ATQB, if Extended ATQB is supported in the terminal apparatus 1. The terminal apparatus 1 then acquires the card data contained in ATQB it has received from the IC card 2.

The terminal apparatus 1 can therefore acquire the card data from the IC card 2 during the anti-collision sequence. As a result, an apparatus for processing data received from portable electronic devices, a portable electronic device, and a system for processing data received from portable electronic devices can be provided, each of which can process data at high speed.

Non-contact communication is achieved between the card reader/writer 14 and the IC card 2. Hence, the card data may be stolen while being transmitted from the IC card 2 to the card reader/writer 14. In view of this, some measures should be taken to prevent unauthorized accesses to the card data. The security is enhanced as desired, because the card data is transmitted to the card reader/writer 14 during the anti-collision sequence, as described above.

The card reader/writer 14 acquires the card-data acquisition by the method shown in FIG. 4 or the method shown in FIG. 7. In either method, the time of transmitting the card data can hardly be specified. This can prevent unauthorized accesses to the card data.

Moreover, the card-data acquisition method of FIG. 4 or the card-data acquisition method of FIG. 7 may be selected in accordance with a random number. In this case, the security will be more enhanced.

A second embodiment of this invention will be described.

In this embodiment, the IC card 2 and the terminal apparatus 1 perform mutual authentication. That is, the IC card 2 determines whether it can communicate with the terminal apparatus 1, and the terminal apparatus 1 determines whether it Can communicate with the IC card 2. If the IC card 2 and the terminal apparatus 1 are authenticated to communicate with each other, they will exchange data.

To authenticate each other as an authorized communication partner, the IC card 2 and the terminal apparatus 1 exchange a command and a response several times. In the present embodiment, the mutual authentication is performed, either in part or in entirety, during the anti-collision sequence.

To commence the mutual authentication, the terminal apparatus 1 transmits a mutual-authentication command to the IC card 2. The mutual authentication contains a first authentication command and a second authentication command.

Figure 10:
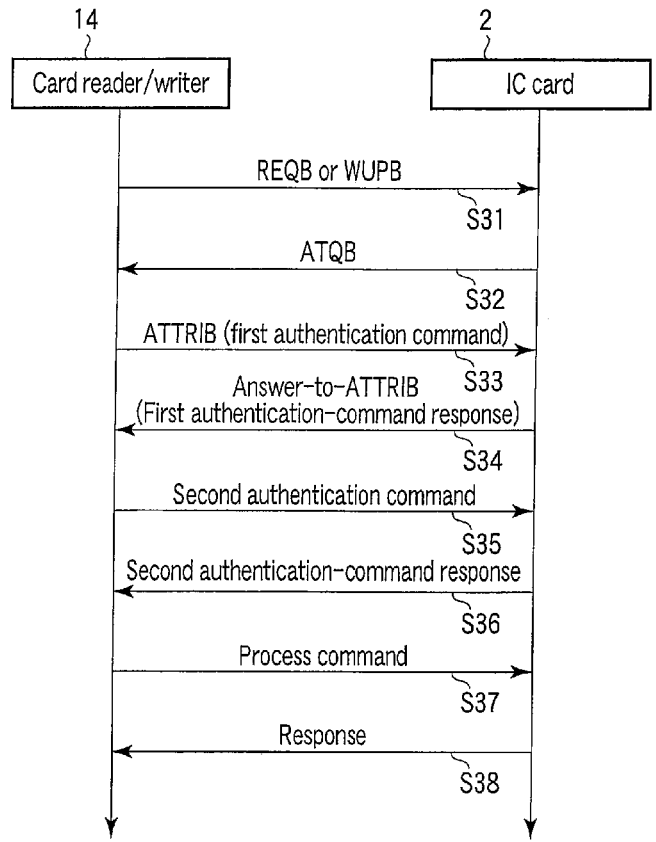
FIG. 10 is a sequence diagram for explaining an exemplary authentication performed in the processing system of portable electronic device according to a second embodiment of this invention.

FIG. 10 is a sequence diagram for explaining how the components of an IC card processing system 10 according to the second embodiment operate to achieve the mutual authentication.

The terminal apparatus 1 transmits REQB or WUPB at predetermined intervals in the region where the IC card 2 can communicate with it (Step S31). REQB or WUPB, i.e., activation command, contains a parameter APf, a use identifier AFI, an attribute-data parameter PARAM, a cyclic redundancy check code CRC_B, etc. Note that the parameter APf is used in REQB of Type B.

The IC card 2 receives a magnetic field emanating from the card reader/writer 14 and generates an electromotive force from the magnetic field. Then, the IC card 2 starts waiting for REQB or WUPB coming from the card reader/writer 14. In this state, the IC card 2 receives either REQB or WUPB (Step S12). The CPU 202 of the IC card 2 then performs setting for achieving the communication with the card reader/writer 14. That is, the CPU 202 functions as setting process unit.

After performing the setting, the CPU 202 generates ATQB in accordance with REQB. ATQB contains, for example, a parameter APa, an identifier, applied data, protocol data, CRC_B, etc. The parameter APa will be used in ATQB of Type B. The identifier is, for example, ID number such as PUPI or CID, inherent to the IC card 2. The applied data conveys application data. The protocol data contains data items, such as communication speed, maximum frame size, protocol type, etc., all supported in the IC card 2.

The modulation/demodulation unit 201 of the IC card 2 performs a signal process on ATQB, causing the antenna 21 to transmit ATQB to the card reader/writer 14 (Step S32).

The card reader/writer 14 receives ATQB transmitted from the IC card 2. From the ATQB, the card reader/writer 14 determines that the IC card 2 exists in the region where the IC card 2 can communicates with it. A plurality of IC cards may exist in this region. If this is the case, the card reader/writer 14 uses a Slot-Marker command or utilizes a time-slot scheme, receiving ATQBs from these IC cards.

On receiving ATQB from the IC card 2, the terminal apparatus 1 generates a medium-select command (ATTRIB).

Figure 11:
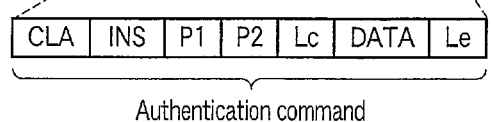
FIG. 11 is a diagram explaining an exemplary format of ATTRIB command that is used in the sequence of FIG. 10.

FIG. 11 is a diagram for explaining the format of ATTRIB transmitted from the terminal apparatus 1 according to the present embodiment. As seen from FIG. 11, ATTRIB contains, for example, a parameter 1D, an identifier, parameter PARAM1-4, higher-layer information, CRC_B, etc. The parameter 1D will be used in ATTRIB of Type B.

In most cases, the higher-layer information is a field used as an optional item and can include any data as desired. In this embodiment, the higher-layer information is the first authentication command.

Therefore, on receiving ATQB from the IC card 2, the control unit 11 of the terminal apparatus 1 generates a random number Rr. The random number Rr is used as authentication data in the present embodiment.

The control unit 11 encrypts the random number Rr, using a key set A, acquiring encrypted data RrA. From the encrypted data RrA, the control unit 11 generates the first authentication command.

As shown in FIG. 11, the first authentication command contains a class byte CLA, a command type INS, parameters P1 and P2, a data-field length Lc, data field DATA, and an expected response-data length Le. If the mutual authentication is performed in Triple-DES scheme, the first authentication command is data consisting of eight (8) bytes. The mutual authentication may be performed in an encryption scheme such as AES or RSA. Even in this case, the mutual authentication can be accomplished only if the first authentication command stored in the higher-layer field is adapted to the encryption scheme.

The control unit 11 stores the first authentication command in the higher-layer information of ATTRIB. The control unit 11 supplies ATTRIB to the card reader/writer 14. The card reader/writer 14 transmits the ATTRIB to the IC card 2 (Step S33).

In the IC card 2, the CPU 202 receives ATTRIB and determined whether the higher-layer information of ATTRIB contains an authentication command. In this case, the CPU 202 functions as a decision unit. If the higher-layer information contains no authentication commands, the IC card 2 performs the mutual authentication in an ordinary manner.

If the higher-layer information of ATTRIB contains an authentication command, the CPU 202 performs the first authentication. In this case, the CPU 202 functions as authentication unit. That is, the CPU 202 decrypts the encrypted data contained in the first authentication command. At the same time, the IC card 2 generates ATA for ATTRIB.

FIG. 12 is a diagram for explaining the format of ATA transmitted from the IC card 2 according to this embodiment. As seen from FIG. 12, ATA contains, for example, MBLI, an identifier CID, a higher-layer response, CRC_B, etc. MBLI is a limit value for the internal buffer.

If the IC card 2 receives ATTRIB containing higher-layer information, it transmits ATA containing a higher-layer response to the terminal apparatus 1. In the present embodiment, the response to the first authentication command (i.e., first authentication-command response) is added to ATA, as the higher-layer response.

On receiving ATTRIB from the terminal apparatus 1, the CPU 202 of the IC card 2 decrypts the encrypted data RrA contained in the first authentication command, by using the key set A. The CPU 202 therefore acquires decrypted data RrA. Further, the CPU 202 encrypts the decrypted RrA, using a key set B. Thus, the CPU 202 acquires encrypted data RrB.

Moreover, the CPU 202 generates a random number Rc. The CPU 202 encrypts the random number Rc, using the key set A. Thus, the CPU 202 acquires encrypted data RcA. The CPU 202 then generates a first authentication-command response from the encrypted data RrB and encrypted data RcA.

As shown in FIG. 12, the first authentication-command response contains data-field DATA, status words SW1 and SW2, etc.

The CPU 202 stores the first authentication-command response in the higher-layer response of ATA. That is, the CPU 202 functions as response-processing unit. The CPU 202 transmits ATA via the antenna 21 to the terminal apparatus 1 (Step S34).

On receiving ATA, the terminal apparatus 1 acquires the first authentication-command response stored in ATA. The control unit 11 of the terminal apparatus 1 performs a process in accordance with the first authentication-command response and then transmits the second authentication command to the IC card 2 (Step S35).

That is, upon receiving ATA from the IC card 2, the control unit 11 decrypts the encrypted data RrB contained the first authentication-command response, by using the key set B. The control unit 11 thereby acquires decrypted data RrB. The control unit 11 then determines whether the decrypted data RrB is identical to the random number Rr. If the decrypted data RrB is identical to the random number Rr, the control unit 11 determines that the IC card 2 is an authenticated one.

Further, the control unit 11 decrypts the encrypted data RcA contained in the first authentication-command response, by using the key set A. The control unit 11 thereby acquires decrypted data RcA. The control unit 11 encrypts the decrypted data RcA, using the key set B. The control unit 11 thereby acquires encrypted data RcB. The control unit 11 generates a second authentication command from the encrypted data RcB. The second authentication command has the same configuration as the conventional one. It is information that contains CLA, INS, P1, P2, Lc, DATA and Le.

On receiving the second authentication command, the IC card 2 transmits the second authentication-command response to the terminal apparatus 1 (Step S36).

That is, the CPU 202 of the IC card 2 decrypts the encrypted data RcB contained in the second authentication command, by using the key set B. The CPU 202 thereby acquires decrypted data RcB.

The CPU 202 then determines whether the decrypted data RcB is identical to the random number Rc. If the decrypted data RcB is identical to the random number Rc, the CPU 202 determines that the terminal apparatus 1 is an authenticated one. The CPU 202 then generates a second authentication-command response. The second authentication-command response has same configuration as the conventional one. It is information that contains DATA, SW1, SW2, etc.

If the IC card 2 and the terminal apparatus 1 are found authenticated as communication partners, through the process described above, they can perform various processes. The terminal apparatus 1 transmits a process command to the IC card 2 (Step S37). In accordance with the process command received, the IC card 2 performs a process and transmits the result of the process, as response, to the terminal apparatus 1 (Step S38).

In the embodiment described above, the first authentication command for initiating the mutual authentication is added to the higher-layer information of ATTRIB, which is transmitted. The number of times the command and response are exchanged between the terminal apparatus 1 and the IC card 1 is thereby reduced. Hence, a processing apparatus of portable electronic devices, a portable electronic device, and a processing system of portable electronic devices can be provided, each of which can process data at high speed.

In the embodiment described above, random numbers Rr and Rc are used as authentication data. The embodiment is not limited to this configuration, nonetheless. For example, PUP1 or CID, either contained in ARQB may be used as authentication data. If this is the case, the IC card 2 can determine that the terminal apparatus 1 has made an error in recognizing the IC card 2, only if it collates the decrypted data with the card ID data stored in the internal memory 204.

The embodiment described above is configured to store the first authentication command in the higher-layer field of ATTRIB. Instead, the first and second authentication commands may be added to REQB and ATTRIB, respectively. In this case, the process can be performed even faster.

FIG. 13 is a sequence diagram for explaining a different authentication process performed in an IC-card data processing system according to the present embodiment.

This authentication process differs from the above-described process, in that the first and second authentication commands are added to the activation command and the medium-select command, respectively.

The terminal apparatus 1 according to this embodiment transmits REQB or WUPB at predetermined intervals in the region where the IC card 2 can communicates with the terminal apparatus 1. REQB or WUPB, i.e., activation command, contains a parameter APf, a use identifier AFI, an attribute-data parameter PARAM, a cyclic redundancy check code CRC_B, etc. The first authentication command contains CLA, INS, P1, P2, Lc, DATA, Le, etc.

The control unit 11 of the terminal apparatus 1 generates a random number Rr. The control unit 11 encrypts the random number Rr, using a key set A. The control unit 11 thereby acquires encrypted data RrA. From the encrypted data RrA, the control unit 11 generates the first authentication command. Then, the control unit 11 adds the first authentication command to the activation command, which is transmitted to the IC card 2 (Step S41).

The IC card 2 receives a magnetic field emanating from the card reader/writer 14 and generates an electromotive force from the magnetic field. Then, the IC card 2 starts waiting for REQB or WUPB. On receiving REQB or WUPB, the CPU 202 of the IC card 2 generates ATQB from the REQB or WUPB. ATQB contains, for example, a parameter, an identifier, applied data, protocol data, CRC_B, first command-response, etc.

That is, on receiving the activation command, the IC card 2 determines whether the activation command contains the first authentication command. If the activation command contains no authentication commands, the IC card 2 performs the mutual authentication in an ordinary manner.

If the first authentication command is added to the activation command, the IC card 2 will perform the first authentication. To this end, the CPU 202 of the IC card 2 acquires the first authentication command added to the activation command received from the terminal apparatus 1. The CPU 202 then decrypts the encrypted data RrA contained in the first authentication command, using the key set A. The CPU 202 thereby acquires decrypted data RrA. The CPU 202 further encrypts the decrypted data RrA, using the key set B, thereby acquiring encrypted data RrB.

Moreover, the CPU 202 generates a random number Rc. The CPU 202 encrypts the random number Rc, using the key set A. Thus, the CPU 202 acquires encrypted data RcA. The CPU 202 then generates a first authentication-command response from the encrypted data RrB and encrypted data RcA. The IC card 2 adds the first authentication-command response to ATQB, which is transmitted to the terminal apparatus 1 (Step S42).

On receiving ATQB, the terminal apparatus 1 generates ATTRIB. At the same time, the terminal apparatus 1 decrypts the encrypted data RrB contained in the first authentication-command response, by using the key set B. The control unit 11 therefore acquires decrypted data RrB. The control unit 11 determines whether the decrypted data RrB is identical to the random number Rr. If the decrypted data RrB is identical to the random number Rr, the control unit 11 determines that the IC card 2 is an authenticated one.

Further, the control unit 11 decrypts the encrypted data RcA contained in the first authentication-command response, using the key set A. The control unit 11 therefore acquires decrypted data RcA. Then, the control unit 11 encrypts the decrypted data RcA, using the key set B. The control unit 11 therefore acquires encrypted data RcB. The control unit 11 generates a second authentication command from the encrypted data RcB. The second authentication command is information that contains CLA, INS, P1, P2, Lc, DATA, Le, etc.

The control unit 11 stores the second authentication command in the higher-layer information of ATTRIB. The control unit 11 supplies ATTRIB to the card reader/writer 14, which transmits the ATTRIB to the IC card 2 (Step S43).

On receiving the ATTRIB, the IC card 2 generates ATA corresponding to ATTRIB. At the same time, the IC card 2 performs the second authentication in accordance with the second authentication command contained in the upper-layer information of ATTRIB.

That is, the CPU 202 of the IC card 2 decrypts the encrypted data RcB contained in the second authentication command received, by using the key set B. The CPU 202 therefore acquires decrypted data RcB. The CPU 202 then determines whether the decrypted data RcB is identical to the random number Rc. If the decrypted data RcB is identical to the random number Rc, the CPU 202 determines that the terminal apparatus 1 is an authenticated one. In this case, the CPU 202 generates a second authentication-command response.

The CPU 202 stores the second authentication-command response in the higher-layer response of ATA. The CPU 202 then transmits ATA via the antenna 21 to the terminal apparatus 1 (Step S44).

If the terminal apparatus 1 and the IC card 2 are found authenticated as mutual communication partners, they can perform various processes. Thus, the terminal apparatus 1 transmits a process command to the IC card 2 (Step S45). The IC card 2 performs a process in accordance with the process command it has received. The result of the process is transmitted from the IC card 2 to the terminal apparatus 1 (Step S46).

In the embodiment described above, the first authentication command for achieving mutual authentication is added to the activation command, and the second authentication command is added to the higher-layer information of ATTRIB, whereby the first and second authentication commands are transmitted. This reduces the number of times the command and response are exchanged between the terminal apparatus 1 and the IC card 1. As a result, a processing apparatus of portable electronic devices, a portable electronic device, and a processing system of portable electronic devices can be provided, each of which can process data at high speed.

In the embodiment described above, the control unit 11 of the terminal apparatus 1 performs signal processing, such as modulation and demodulation. The embodiment is not limited to this configuration, nevertheless. For example, the CPU 143 of the card reader/writer 14 may perform signal processing.

In the embodiment described above, the terminal apparatus 1 and the IC card 2 acquire card data or mutually authenticate each other during the anti-collision sequence. Nonetheless, the embodiment is not limited to this configuration. Any data can be added to the higher-layer information and the higher-layer response, only if it is information that can be so added.

For example, information for setting a command-wait time to the higher-layer response may be added to the higher-layer response. In this case, the wait time can be shortened in the terminal apparatus 1.

The terminal apparatus 1 measures the time that has elapsed from the transmission of a command to the IC card 1. If the terminal apparatus 1 receives no responses from the IC card 2 within a predetermined time from the start of measuring time, it determines that the IC card 2 has made an error and is unable to make responses.

The time elapsing until the terminal apparatus 1 receive a response differs, depending on the type of command. The terminal apparatus 1 therefore needs some time to determine whether the IC card 2 has made no responses.

In view of this, the IC card 2 adds such data as shown in FIG. 14 (i.e., wait time) to the higher-layer response, thereby generating ATA. The IC card 2 transmits ATA to the terminal apparatus 1.

FIG. 14 is a diagram for explaining the wait time data. The data shown in FIG. 14 is stored in, for example, the memory 204 of the IC card 2. As seen from in FIG. 14, the IC card 2 sets the maximum wait time for each command and stores the same. The maximum wait time is a period that elapses until the terminal apparatus 1 receives a response after transmitting a command.

On receiving the wait time data, the terminal apparatus 1 determines, from the wait time data, whether the IC card 2 has made an error and cannot now make a response. That is, the moment the terminal apparatus 1 transmits the command to the IC card 2, it starts waiting for a response from the IC card 2 until the maximum wait time elapses. If no responses come within the maximum wait time, the terminal apparatus 1 determines that the IC card 2 has made an error and now cannot make a response.

Thus, the wait time the terminal apparatus 1 has if the IC card 2 makes an error and is unable to make a response can be shortened.

The embodiments described above have been described on the assumption that the communication protocol of Type B is utilized. Nonetheless, any other communication protocol can be used in this invention, so far as the protocol can use, as activation command or select command, a command that is large enough to contain an authentication command.

In the embodiments described above have, the IC card 2 is one that performs non-contact communication. The IC card 2 is not limited to this type, nevertheless. The IC card 2 may be, for example, a combination-type card that can achieve both contact communication and non-contact communication.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processing apparatus of portable electronic devices, comprising:
   a transmitting/receiving unit configured to transmit and receive data to and from a portable electronic device;
   a first command processing unit configured to cause the transmitting/receiving unit to transmit an activation command and a medium-select command to the portable electronic device; and
   a second command processing unit configured to add at least a part of a mutual authentication command to the medium-select command the first command processing unit is to transmit to the portable electronic device.

2. The processing apparatus according to claim 1, wherein the mutual authentication command comprises a first authentication command and a second authentication command, and the second command processing unit adds the first authentication command in the medium-select command.

3. The processing apparatus according to claim 1, wherein the second command processing unit generates the first authentication command by using, as authentication data, card ID data contained in a response the portable electronic device transmits on receiving the activation command.

4. The processing apparatus according to claim 1, wherein the mutual authentication command comprises a first authentication command and a second authentication command, and the second command processing unit adds the first authentication command to the activation command and adds the second authentication command in the medium-select command.

5. A portable electronic device comprising:
a transmitting/receiving unit configured to transmit and receive data to and from a processing apparatus of portable electronic devices;
a first response processing unit configured to generate a first response based on a medium-select command received at the transmitting/receiving unit, and to transmit the first response to the processing apparatus; and
a second response processing unit configured to perform authentication in accordance with a mutual authentication command when the medium-select command stores at least a part of the mutual authentication command, to generate a second response from the result of the authentication and to add the second response to the first response.

6. The portable electronic device according to claim 5, further comprising a memory configured to store card ID data,
wherein the second response processing unit detects an error the processing apparatus has made in recognizing the device in accordance with whether the card ID data stored in the memory is identical to the card ID data stored in the mutual authentication command, when the card ID data is stored in the mutual authentication command stored in the medium-select command.

7. A processing system having a portable electronic device and a processing apparatus of the portable electronic devices, the processing apparatus comprising:
a first transmitting/receiving unit configured to transmit and receive data to and from a portable electronic device;
a first command processing unit configured to cause the transmitting/receiving unit to transmit an activation command and a medium-select command to the portable electronic device; and
a second command processing unit configured to add at least a part of a mutual authentication command to the medium-select command the first command processing unit is to transmit to the portable electronic device, and
the portable electronic device comprising:
a transmitting/receiving unit configured to transmit and receive data to and from the processing apparatus;
a first response processing unit configured to generate a first response based on a medium-select command received at the transmitting/receiving unit, and to transmit the first response to the portable electronic; and
a second response processing unit configured to perform authentication in accordance with a mutual authentication command when the medium-select command stores at least a part of the mutual authentication command, to generate a second response from the result of the authentication and to add the second response to the first response.

* * * * *